(12) United States Patent
Lemus-Yegres et al.

(10) Patent No.: US 9,527,071 B2
(45) Date of Patent: Dec. 27, 2016

(54) SCR CATALYST AND METHOD OF PREPARATION THEREOF

(75) Inventors: Lived J. Lemus-Yegres, Copenhagen (DK); Niklas Bengt Jakobsson, Kågeröd (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/405,851

(22) PCT Filed: Aug. 31, 2012

(86) PCT No.: PCT/EP2012/066976
§ 371 (c)(1),
(2), (4) Date: Dec. 5, 2014

(87) PCT Pub. No.: WO2013/182255
PCT Pub. Date: Dec. 12, 2013

(65) Prior Publication Data
US 2015/0151293 A1   Jun. 4, 2015

(30) Foreign Application Priority Data

Jun. 6, 2012  (DK) ................................ 2012 70304

(51) Int. Cl.
| | | |
|---|---|---|
| *B01J 29/06* | (2006.01) | |
| *B01J 37/12* | (2006.01) | |
| *B01J 37/02* | (2006.01) | |
| *B01J 35/00* | (2006.01) | |
| *B01J 29/76* | (2006.01) | |
| *B01J 35/04* | (2006.01) | |
| *B01J 35/06* | (2006.01) | |
| *B01D 53/86* | (2006.01) | |
| *B01D 53/94* | (2006.01) | |
| *B01J 23/10* | (2006.01) | |
| *B01J 29/70* | (2006.01) | |
| *B01J 29/78* | (2006.01) | |

(52) U.S. Cl.
CPC ............ *B01J 37/12* (2013.01); *B01D 53/8628* (2013.01); *B01D 53/9418* (2013.01); *B01J 23/10* (2013.01); *B01J 29/7615* (2013.01); *B01J 35/0006* (2013.01); *B01J 35/04* (2013.01); *B01J 35/06* (2013.01); *B01J 37/0228* (2013.01); *B01J 37/0244* (2013.01); *B01J 37/0246* (2013.01); *B01D 2255/2065* (2013.01); *B01D 2255/2068* (2013.01); *B01D 2255/20707* (2013.01); *B01D 2255/20738* (2013.01); *B01D 2255/20776* (2013.01); *B01D 2255/30* (2013.01); *B01D 2255/502* (2013.01); *B01D 2255/70* (2013.01); *B01D 2258/01* (2013.01); *B01D 2258/012* (2013.01); *B01D 2258/0283* (2013.01); *B01J 29/7057* (2013.01); *B01J 29/7815* (2013.01)

(58) Field of Classification Search
USPC ........................... 502/63, 64, 65, 66, 73, 74
See application file for complete search history.

(56) References Cited

U.S. PATENT DOCUMENTS

| | | | | |
|---|---|---|---|---|
| 5,194,078 | A * | 3/1993 | Yonemura | ........... C04B 38/0006 55/466 |
| 2010/0196221 | A1 | 8/2010 | Ando et al. | |
| 2011/0065568 | A1* | 3/2011 | Shinoda | ............. B01D 53/9418 502/73 |

FOREIGN PATENT DOCUMENTS

| | | |
|---|---|---|
| CN | 101842157 A | 9/2010 |
| CN | 102026722 A | 4/2011 |
| EP | 1 810 750 A1 | 7/2007 |
| EP | 2 113 296 A2 | 11/2009 |
| EP | 2 213 371 A1 | 8/2010 |
| EP | 2 286 914 A1 | 2/2011 |

* cited by examiner

*Primary Examiner* — Elizabeth Wood
(74) *Attorney, Agent, or Firm* — Blank Rome LLP

(57) ABSTRACT

$NH_3$—SCR catalyst, containing iron promoted beta-zeolite, cerium oxide and titanium oxide and optionally further containing at least one of tungsten oxide, neodymium oxide, silicon oxide and diatomaceous earth, and method of preparation thereof.

6 Claims, 1 Drawing Sheet

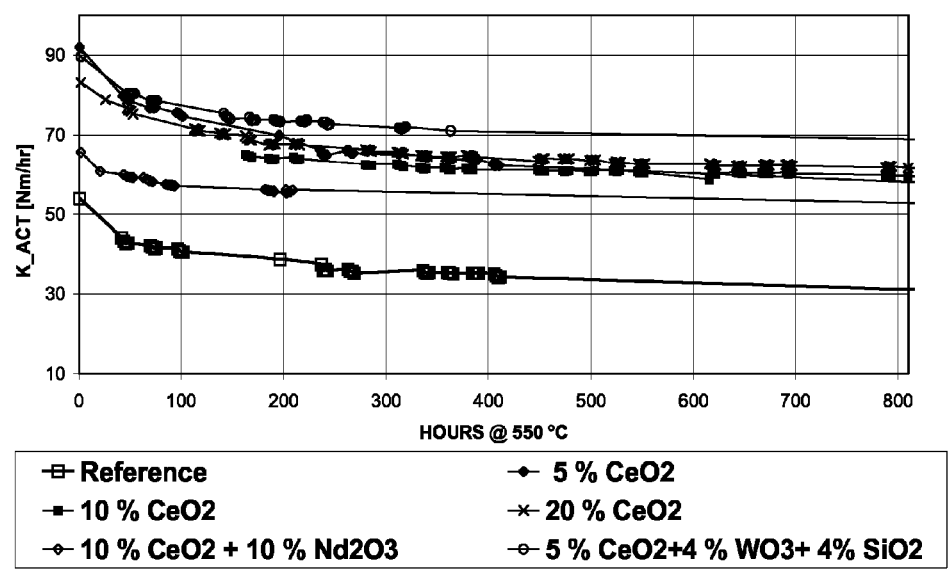

SCR CATALYST AND METHOD OF PREPARATION THEREOF

The present invention relates to a catalyst composition for use in selective reduction of nitrogen oxides (SCR) in exhaust gas by reaction with ammonia and a method of preparing the SCR catalyst composition.

In particular, the invention provides an $NH_3$—SCR catalyst, containing iron promoted beta-zeolite, cerium oxide and titanium oxide and optionally further containing at least one of tungsten oxide, neodymium oxide, silicon oxide and diatomaceous earth.

SCR for the removal of nitrogen oxides (NOx) from flue and exhaust gases is a well known process. In the literature numerous catalysts are disclosed being active catalysts in the reaction of NOx with ammonia to nitrogen (DeNOx).

A problem with the known DeNOx catalysts is the low activity at high temperatures above 500° C.

We have now found a particular catalyst composition, which is an active $NH_3$—SCR catalyst at temperature above 500° C.

Thus, this invention provides an SCR catalyst composition containing of iron promoted beta-zeolite, cerium oxide and titanium oxide deposited on a substrate.

It has further revealed that the catalytic activity of the catalyst can be further improved when including at least of one of tungsten oxide, neodymium oxide, silicon oxide and diatomaceous earth in the composition.

Certain types of flue gas contain a large fraction of suspended solids i.e. dust or soot resulting in a high erosion propensity.

It has been found that addition of diatomaceous earth to titanium oxide results in an improved resistance towards erosion.

Thus, depending on the application, it may be preferred to include diatomaceous earth in the catalyst composition in an amount of up to 60 wt % diatomaceous earth All amounts specified above and in the following are calculated in percentages by weight calculated on the total amount of the catalyst composition including the substrate if not specified otherwise.

In an embodiment of the invention, the catalyst composition preferably further contains at least one of tungsten oxide, neodymium oxide, silicon oxide and diatomaceous earth.

The substrate comprises preferably a fibrous material and is formed in a corrugated shape.

In a preferred embodiment of the invention, the catalyst composition contains 5 to 60 wt % iron promoted beta-zeolite, 2 to 20 wt % cerium oxide and 20 to 70 wt % titanium oxide and optionally 2 to 6 wt % WO3 and 2 to 6 wt % SiO2.

The amount of iron in the beta-zeolite is preferably between 0.5 and 15 wt % calculated on the amount of the beta-zeolite.

The catalyst compositions according to the invention provide a high temperature SCR catalyst with long term stability.

The compositions are in general useful in the denitrification of engine exhaust gases and exhaust gas from stationary sources e.g. power stations.

For some of these applications, it is preferred that the catalyst composition is supported on a monolithic structured substrate.

A preferred fibrous substrate is in corrugated form.

The catalyst can also be supported on a particulate wall flow filter, for instance in an exhaust gas cleaning system of a compression ignition engine.

The invention provides additionally a method for the preparation of the SCR catalyst disclosed and defined above, comprising the steps of providing a substrate;

providing a wash coat consisting of iron promoted beta-zeolite and titanium oxide and optionally further containing silicon oxide and/or diatomaceous earth;

coating the substrate with the wash coat and drying and calcining the wash coated substrate;

subsequently impregnating the calcined wash coated substrate with an aqueous solution with a cerium oxide precursor and optionally a precursor of a tungsten oxide and/or a neodymium oxide; and calcining the impregnated substrate to convert the cerium oxide precursor to cerium oxide and the optional tungsten and/or neodymium oxide precursor to tungsten oxide and/or neodymium oxide.

Preferably, the wash coat contains 5 to 60 wt % iron promoted beta-zeolite, 2 to 20 wt % cerium oxide and 20 to 70 wt % titanium oxide of the total amount of the wash coat and the substrate.

If present in the catalyst composition preferred amounts of tungsten oxide are 2 to 6 wt %, of silicon oxide 2 to 6 wt % and of diatomaceous earth 0 to 60% of the total amount of the wash coat and the substrate.

The amount the iron promoter in the beta-zeolite is preferably 0.5 to 15 wt % calculated on the amount of the beta-zeolite.

In an embodiment of the invention, the substrate comprises fibrous material, preferably consisting of fibre glass or ceramic fibres.

EXAMPLES

Example 1

Preparation of a catalyst according to a specific embodiment of the invention consists of the following steps:

providing a corrugated fibre glass substrate;

providing a wash coat consisting of 30% iron promoted beta-zeolite containing 0.5 wt % iron and 40 wt % titanium oxide;

mixing the components with butanol;

coating the substrate with the wash coat and drying and calcining the wash coated substrate;

subsequently impregnating the calcined wash coated substrate at 550° C. with an aqueous solution with a cerium nitrate as cerium oxide precursor;

and calcining the impregnated substrate at 450° C. to convert the cerium oxide precursor to cerium oxide and reach to 10 wt % cerium oxide in the finished catalyst.

Example 2

Catalyst Test

A comparison of the activity level at 550° C. over time is given in the present example with:

1) A reference Fe beta/TiO2 catalyst.
2) A reference Fe beta/TiO2 catalyst with 5% CeO2.
3) A reference Fe beta/TiO2 catalyst with 10% CeO2.
4) A reference Fe beta/TiO2 catalyst with 20% CeO2.
5) A reference Fe beta/TiO2 catalyst with 10% CeO2 and 10% $Nd_2O_3$.

6) A reference Fe beta/TiO2 catalyst with 5% CeO2, 4% WO3 and 4% SiO2.

The catalyst was tested in a laboratory reactor using plates cut from monolith samples and aligned with gas flow along the plate surface. The reactor was loaded with 4 plates (length 3.5 cm, width 1.1 cm, thickness 0.8 mm). The inlet gas contain 5% H2O, 4% $O_2$ and $N_2$ as balance. The inlet NO concentration was 500 ppm and the inlet $NH_3$/NO ratio was 1.5. The temperature was 550° C. and the equivalent GHSV was 72 000 Nm3/m3/h. The gas flow per catalyst weight was 80 $Nm^3$/h/kg.

The activity coefficient is calculated as:

$$K_{NOx}=-\text{NHSV}*\ln(1-\text{NO conversion}).$$

The performance of the above listed catalysts 1-6 is summarized in FIG. 1 of the drawings.

The invention claimed is:

1. SCR catalyst composition deposited on a substrate, consisting of
    5 to 60 wt % iron promoted beta zeolite,
    20 to 70 wt % titanium oxide,
    2 to 20 wt % cerium oxide,
    2 to 6 wt % tungsten oxide,
    2 to 6 wt % silicon oxide, and
    0 to 60 wt % diatomaceous earth of the total catalyst composition and the substrate.

2. The SCR catalyst composition of claim 1, wherein the iron promoted beta-zeolite contains 0.5 to 15 wt % iron of the amount of the beta-zeolite.

3. The SCR catalyst composition of claim 1, wherein the substrate comprises a fibrous material.

4. The SCR catalyst composition of claim 3, wherein the fibrous material consists of fibre glass or ceramic fibres.

5. The SCR catalyst composition of claim 1, wherein the substrate is shaped in corrugated form.

6. The SCR catalyst composition according to claim 1, wherein the substrate is a particulate wall flow filter.

* * * * *